United States Patent [19]

Stoller

[11] 4,048,346

[45] Sept. 13, 1977

[54] METHOD OF STABILIZING LACTOSE COMPOSITIONS

[75] Inventor: Jerry H. Stoller, Houston, Tex.

[73] Assignee: Stoller Chemical Company, Inc., Houston, Tex.

[21] Appl. No.: 632,236

[22] Filed: Nov. 17, 1975

[51] Int. Cl.$^2$ ............................................ A23C 21/00
[52] U.S. Cl. .................. 426/583; 426/491; 426/641; 426/658; 426/807
[58] Field of Search ................ 426/641, 658, 41, 491, 426/580, 583, 330, 330.2, 334, 807; 260/124 R, 124 A, 209 R; 127/30, 31

[56] References Cited

U.S. PATENT DOCUMENTS

| 2,728,678 | 12/1955 | Sharp | 426/583 |
|---|---|---|---|
| 2,781,267 | 2/1957 | Traisman et al. | 426/491 |
| 3,472,659 | 10/1969 | Mathur et al. | 426/330.2 |

OTHER PUBLICATIONS

Michaels et al. "Influences of Additives on Growth Rate in Lactose Crystals" Cited in Chemical Abstracts 66:99174g.

Takashi et al. "Inhibiton of Crystalline Growth of 2,6 Dichlorobenzonitrile-Containing Preparation" Chem. Absts. 81:128096a.

*Primary Examiner*—Raymond N. Jones
*Assistant Examiner*—R. B. Penland
*Attorney, Agent, or Firm*—Browning, Bushman & Zamecki

[57] ABSTRACT

A method of stabilizing a concentrated lactose containing mixture such as cheese whey by adding to the mixture certain lignin sulfonates in an amount sufficient to retard crystal growth of lactose. The lignin sulfonate can be added prior to or after the lactose mixture is concentrated. There is also provided an animal food supplement comprising a concentrated whey and an amount of certain lignin sulfonates sufficient to retard crystal growth of lactose in the concentrated whey and maintain the animal food supplement in a flowable form.

20 Claims, No Drawings

METHOD OF STABILIZING LACTOSE COMPOSITIONS

BACKGROUND OF THE INVENTION

The present invention relates to a method for the stabilization of lactose enriched aqueous mixtures and more particularly to the stabilization of concentrated whey such as cheese whey.

Cheese whey is obtained as a by-product in the manufacture of cheese and generally has a solids content of about 3 to about 8% by weight. The cheese whey, which is about 90% water, contains lactose, some protein and small amounts of vitamins and minerals. Cheese whey has long been used as an animal food supplement, the lactose serving as a high energy nutrient. However, because of its high water content and, accordingly, low nutrient content, transportation of the cheese whey for long distances for use as an animal food supplement is not economical.

Ideally, one would concentrate the cheese whey to a product containing about 35 to 55% by weight solids without removal of any lactose. Such a material would be economical to transport for use as an animal food supplement. However, there are problems associated with concentrating the cheese whey to provide a higher solids content. Highly concentrated cheese whey tends to "set up" due to lactose crystal growth. Such a product is essentially non-flowable. This non-flowable characteristic of concentrated whey makes its use as an animal food supplement uneconomical because special handling equipment must be employed to transport the material and incorporate it into the animal food.

In an effort to make greater utilization of cheese whey as an animal food supplement, several approaches have been used. One technique involves essentially complete removal of the water from the cheese whey leaving a powder which can be easily handled and transported. This process is time consuming, requires a great deal of energy to effect evaporation of the water and, if not properly carried out, may result in degradation of the dried whey. A second approach which has been used is to remove part of the lactose from the cheese whey and concentrate the remaining product until it has a 35 to 45% by weight solids content. The latter approach is undesirable since it dilutes the lactose content of the whey and thereby reduces its value as an animal food supplement.

An additional problem associated with cheese whey is that if the whey is not effectively utilized, as for example as an animal food supplement, it presents a disposal problem. Whey is a water pollutant and hence should not be discharged into streams, lakes or the like. Accordingly, a method which would make economical use of whey and thereby obviate its discharge as a waste product into streams as highly desirable from an ecological standpoint.

SUMMARY OF THE INVENTION

It is therefore an object of the present invention to provide a method for stabilizing a lactose enriched aqueous mixture.

Another object of the present invention is to provide a method for maintaining a concentrated whey, having a high solids content, in a flowable form.

A further object of the present invention is to provide a method for controlling crystal growth in aqueous lactose mixtures containing high concentration of lactose.

Still a further object of the present invention is to provide animal food supplement containing a concentrated whey.

These and other objects of the invention will become apparent from the description given herein and the appended claims.

In one embodiment, the present invention provides a method of controlling crystal growth in an aqueous lactose mixture wherein the concentration of lactose is from about 20 to about 35% by weight. The method involves the addition of certain lignin sulfonates in an amount sufficient to retard growth of lactose crystals. By retarding such growth, the mixture is stabilized to the extent that it does not set up and remains flowable.

A more specific embodiment of the present invention involves a method of providing a flowable composition having a high concentration of lactose wherein a lactose containing mixture is concentrated to obtain a product containing from about 20 to about 35% by weight lactose followed by the addition of an amount of the lignin sulfonate sufficient to maintain the concentrate in a flowable form. The lignin sulfonate is added prior to substantial crystal growth of the lactose.

In another embodiment of the present invention, there is provided a method of concentrating a lactose containing mixture to increase the solids content comprising adding to the mixture a stabilizing amount of an ingestible, non-toxic lignin sulfonate followed by a concentration of the resulting mixture to obtain a composition containing at least 20% by weight lactose.

In still another embodiment of the present invention, there is provided an animal food supplement comprised of a concentrated whey containing from about 35 to about 55% by weight solids and an amount of ingestible, non-toxic lignin sulfonate sufficient to maintain the food supplement in a flowable form.

DESCRIPTION OF THE PREFERRED EMBODIMENTS

A typical whey, such as cheese whey, contains about 1.5 - 6% by weight lactose, small amounts of protein, combined fat and mineral matter and approximately 90% by weight water. A typical whey has a solids content by weight of about 3 to 8%. If whey, e.g. cheese whey, is evaporated to a point where the solids content rises to about 14 to about 25% by weight, lactose crystals begin to form. As the solids concentration goes even higher and if the concentrated whey is allowed to stand, lactose crystallization takes place via the mechanism of the growth of relatively few, large crystals at the expense of the formation of relatively more, smaller crystals.

Formation of large crystals in a concentrated whey makes for a product which, depending on the solids concentration, is non-flowable in the sense that the product is not fluid enough to be handled by normal fluid and/or slurry handling equipment. Indeed, concentrated whey mixtures containing 45 to 55% by weight solids tend to "set up" and are essentially non-fluid at ambient temperature.

It has now been found that lactose containing mixtures such as whey, particularly cheese whey, can be concentrated to provide compositions containing from about 20 to about 35% by weight lactose and, in the case of whey from about 35 to about 55% by weight solids and still be kept in a fluid or flowable form to the extent that the compositions can be handled by liquid and/or slurry handling equipment. The discovery is based on the fact that certain ingestible, non-toxic lignin sulfonates added to the lactose composition, e.g. the whey, prior to its concentration, or at least before substantial crystal growth of the lactose sets in will maintain the resulting concentrated composition in a flowable form. While the precise action of the lignin sulfonate in controlling the crystal growth of lactose in the whey or other lactose containing mixtures is not understood, it is believed that the lignin sulfonates act in the form of seed crystals and thus form the nucleus for many fine crystals of lactose. Additionally, it has been observed that the lignin sulfonates lower the surface tension around individual crystal particles to the extent that crystal growth is inhibited. The net result is that crystal growth of individual crystals is retarded leading to the formation of many fine crystals which remain more fluid. This lowering of surface tension around the solid particles in the concentrate aids in maintaining the concentrated whey in a more fluid condition.

The term lignin sulfonate, as used herein, refers to any ingestible, non-toxic salt made from the lignin of sulfite pulp-mill liquors. The lignin sulfonates must be ingestible and non-toxic since the lactose or whey compositions are used as animal food supplements. Particularly desirable lignin sulfonates are the ammonium, sodium, calcium and magnesium salts. The lignin sulfonates used herein can be used in the form of dispersions or collodial solutions in water, such dispersions or solutions containing varying amounts of the lignin sulfonates ranging from about 6 to about 60% by weight of the solution or dispersion, Alternately, the lignin sulfonates can be added as solid in a dry powder form. Such solid lignin sulfonates are obtained by spray drying of the aqueous solution or dispersions. The lignin sulfonates are added in an amount sufficient to stabilize the composition, i.e. to retard crystal growth of the lactose, and maintain the resulting concentrate in a flowable form which can be handled by conventional liquid and/or slurry handling equipment. Generally speaking, the lignin sulfonate, as lignin sulfonate, is added in an amount such that its concentration in the resulting concentrate is from about 0.25 to about 6% by weight.

As noted above, while the present invention is applicable to virtually any aqueous solution and/or mixture containing lactose, it finds particular application in the treatment of whey, particularly cheese whey. Accordingly, while the invention will be described with particular reference to whey, it is to be understood that the method is applicable to virtually any aqueous solution and/or mixture of lactose.

The method of the present invention can be conducted in several ways. In one procedure, the raw whey, i.e. the whey containing from about 3-8% by weight solids, can be admixed with the appropriate amount of the lignin sulfonate, as specified above, followed by concentration of the whey to the desired solids level, usually from about 3 to about 55% by weight. In concentrating the whey, several methods may be employed. The water in the whey may be simply evaporated by well known techniques or processes such as reverse osmosis can be used to reduce the water content of the whey and achieve the desired solids level. Addition of the lignin sulfonate to the whey prior to its concentration ensures that as the whey is concentrated and hence the lactose concentration rises, crystal growth of the lactose will be retarded.

In an alternate procedure, the whey can be first concentrated in a manner described above and the lignin sulfonate added to the concentrated whey prior to the time substantial crystal growth of the lactose occurs. The term "substantial crystal growth" as used herein, refers to crystal size sufficient to prevent the concentrated material from being fluid in the sense that it can be handled or processed with conventional fluid or slurry handling equipment. In this alternate process, if the whey is concentrated by evaporation of the water, it is preferable that the lignin sulfonate be added to the concentrate while it is above ambient temperature.

The concentrated whey and lignin sulfonate mixture obtained by either of the above described methods can be advantageously employed as an animal food supplement. Lactose is a high energy nutrient for animals. Additionally, the concentrated whey contains valuable minerals and vitamins as well as small amounts of protein. The lignin sulfonates derived from the sulfite method of paper pulping have been approved by the Food and Drug Administration for use in livestock feed.

In order to more fully illustrate the invention, the following non-limiting examples are presented.

EXAMPLE I

A typical cheese whey was concentrated in an evaporator to obtain various concentrated wheys having solids contents ranging from 35 to 55% by weight. While the concentrated wheys were still at elevated temperatures ($\sim 130°$ F) and hence before any substantial lactose crystal growth had occurred, various lignin sulfonates, in varying amounts, were added. The lignin sulfonates employed were the ammonium, sodium, calcium, and magnesium salts. The lignin sulfonates were added in increments of approximately 1% beginning with a 1% by weight addition up to about 5% by weight. It was found that in the case of calcium lignin sulfonate, an amount of about 3% by weight of the concentrate was necessary to maintain a whey concentrate in flowable form.

It was found particularly desirable that the lignin sulfonate content of the concentrate be around 4% by weight. At this level, all lignin sulfonates tried were effective in maintaining all the concentrated wheys flowable even at a solids concentration of 55% by weight.

EXAMPLE II

A concentrated whey obtained by the process described in Example I and containing 55% by weight solids and no lignin sulfonate was permitted to cool and stand for several days. The thus concentrated whey without the lignin sulfonate set up and was not fluid. This is to be contrasted with the whey concentrates of Example I which remained fluid and could be handled by liquid and/or slurry handling equipment even at a solids concentration of 55% by weight.

The concentrated wheys obtained as per Example I, being easily transportable and processed by conventional liquid and/or slurry handling equipment, make ideal animal food supplements. The products are high in lactose, an energy nutrient for animals, contain some protein and valuable vitamins and minerals. Additionally, the lignin sulfonate being ingestible and non-toxic have no deleterious effects on livestock.

Although the invention has been described with a certain degree of particularly, it is to be understood that such description has been made only by way of example, and that numerous changes in the details of the methods and compositions disclosed may be resorted to without departing from the spirit and scope of the invention as hereinafter claimed.

I claim:

1. A method of providing a flowable composition having a high concentration of solid lactose comprising concentrating a lactose containing mixture to obtain a product having from about 20 to about 45% by weight lactose and admixing said product with a stabilizing amount of an ingestible, non-toxic lignin sulfonate, said lignin sulfonate being present in an amount sufficient to maintain said composition in a flowable form, said lignin sulfonate being added prior to substantial crystal growth of said lactose.

2. The method of claim 1 wherein said lactose containing mixture comprises whey.

3. The method of claim 2 wherein said whey is concentrated to obtain a product having from about 35 to about 55% by weight solids.

4. The method of claim 3 wherein said lignin sulfonate is selected from the class consisting of the ammonium, sodium, calcium, and magnesium salts.

5. The method of claim 2 wherein said whey is concentrated by evaporation of water from said whey.

6. The method of claim 2 wherein said whey is concentrated by reverse osmosis.

7. The method of claim 2 wherein said lignin sulfonate is present in an amount of from about 0.25 to about 6% by weight of said composition.

8. The method of claim 7 wherein said lignin sulfonate is selected from the class consisting of the ammonium, sodium, calcium and magnesium salts.

9. A method of concentrating a lactose containing mixture to increase the solids content comprising adding to said mixture a stabilizing amount of an ingestible, non-toxic lignin sulfonate, and concentrating the resulting mixture to obtain a composition containing at least 20% by weight lactose.

10. The method of claim 9 wherein lactose containing mixture comprises whey.

11. The method of claim 10 wherein said whey is concentrated to obtain a product having from about 35 to about 55% by weight solids.

12. The method of claim 11 wherein said lignin sulfonate is selected from the class consisting of the ammonium, sodium, calcium, and magnesium salts.

13. The method of claim 10 wherein said whey is concentrated by evaporation of water from whey.

14. The method of claim 10 wherein said whey is concentrated by reverse osmosis.

15. The method of claim 10 wherein said lignin sulfonate is present in an amount from about 0.25 to 6% by weight of said composition.

16. The method of claim 15 wherein said lignin sulfonate is selected from the class consisting of ammonium, sodium, calcium, and magnesium salts of lignin sulfonate.

17. An animal food supplement comprising a concentrated cheese whey containing from about 35 to about 55% by weight solids and an effective amount of an ingestible, non-toxic lignin sulfonate, said lignin sulfonate being present in an amount sufficient to maintain said food supplement in a flowable form.

18. A method of controlling crystal growth in an aqueous lactose mixture containing from about 20 to about 35% by weight lactose comprising admixing said mixture with a stabilizing amount of an ingestible, non-toxic lignin sulfonate, said lignin sulfonate being present in an amount sufficient to prevent substantial crystal growth of said lactose.

19. The method of claim 18 wherein said lignin sulfonate is selected from the class consisting of the ammonium, sodium, calcium, and magnesium salts.

20. The method of claim 19 wherein said lignin sulfonate is present in an amount from about 0.25 to about 6% of said mixture.

* * * * *